United States Patent
Lai et al.

(10) Patent No.: US 12,307,020 B1
(45) Date of Patent: May 20, 2025

(54) WEARABLE DEVICE, GESTURE RECOGNITION METHOD AND NON-TRANSITORY COMPUTER READABLE STORAGE MEDIUM THEREOF

(71) Applicant: HTC Corporation, Taoyuan (TW)

(72) Inventors: Chao-Hsiang Lai, Taoyuan (TW); Cheng-Han Hsieh, Taoyuan (TW); Yu-Fu Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/518,401

(22) Filed: Nov. 22, 2023

(51) Int. Cl.
*G06F 3/01* (2006.01)
*G06F 3/0346* (2013.01)

(52) U.S. Cl.
CPC .............. *G06F 3/017* (2013.01); *G06F 3/015* (2013.01); *G06F 3/0346* (2013.01)

(58) Field of Classification Search
CPC ......... G06F 3/017; G06F 3/015; G06F 3/0346
See application file for complete search history.

(56) References Cited

U.S. PATENT DOCUMENTS

2022/0236795 A1* 7/2022 Jonker ................... G06F 3/011

FOREIGN PATENT DOCUMENTS

| CN | 112041784 A | 12/2020 |
|---|---|---|
| CN | 115344120 A | 11/2022 |
| CN | 116821743 A | 9/2023 |
| TW | 201827008 A | 8/2018 |
| TW | 202301079 A | 1/2023 |

OTHER PUBLICATIONS

The office action of the corresponding Taiwanese application No. TW113108733 issued on Feb. 24, 2025.

* cited by examiner

*Primary Examiner* — Yaron Cohen
(74) *Attorney, Agent, or Firm* — CKC & Partners Co., LLC

(57) ABSTRACT

A wearable device, gesture recognition method, and non-transitory computer readable storage medium thereof are provided. The device determines at a first time point that a single-channel electromyography signal in a first time interval is in a non-neutral state or a neutral state. In response to the single-channel electromyography signal in the first time interval being in the non-neutral state, the device recognizes a gesture of a user at the first time point based on a plurality of inertial measurement parameters.

20 Claims, 7 Drawing Sheets

WEARABLE DEVICE, GESTURE RECOGNITION METHOD AND NON-TRANSITORY COMPUTER READABLE STORAGE MEDIUM THEREOF

BACKGROUND

Field of Invention

The present invention relates to a wearable device, gesture recognition method, and non-transitory computer readable storage medium thereof. More particularly, the present invention relates to a wearable device, gesture recognition method, and non-transitory computer readable storage medium thereof that can correctly recognize gestures.

Description of Related Art

In recent years, various technologies related to virtual reality have developed rapidly, and various technologies and applications of head-mounted displays have been proposed one after another.

In the existing technology, user gestures can be recognized mainly through three methods: image recognition, inertial measurement parameters, or electromyography signals of wearable devices. However, each approach has its drawbacks when implemented individually.

Specifically, when performing image recognition through the image of the image capture device, when the user's hand exceeds the field of view (FOV) of the image capture device or when the hand is blocked, it will be difficult to correctly recognize the user's gestures.

In addition, the inertial measurement parameters can only classify real-time gestures, but cannot detect the continuity of gestures (for example, if the user continues to maintain a gesture, it will not be detected).

In addition, although electromyography signals can detect the continuity of gestures, since the classification accuracy of electromyography signals is lower than the classification accuracy of inertial measurement parameters, multi-channel electromyography sensors are required for detection. However, since the multi-channel electromyography sensor requires a calibration process for the electromyography sensor before use (for example: calibrating the multi-channel electromyography sensor at the user's hand position). Therefore, the user experience is poor.

Accordingly, there is an urgent need for a technology that can correctly recognize gestures.

SUMMARY

An objective of the present disclosure is to provide a wearable device. The wearable device comprises an inertial sensor, a single-channel electromyography sensor, and a processor, and the processor is coupled to the inertial sensor and the single-channel electromyography sensor. The inertial sensor is configured to generate a plurality of inertial measurement parameters corresponding to a hand of a user. The single-channel electromyography sensor is configured to generate a single-channel electromyography signal corresponding to the hand. The processor determines at a first time point that the single-channel electromyography signal in a first time interval is in a non-neutral state or a neutral state. The processor recognizes a gesture of the user at the first time point based on the inertial measurement parameters in response to the single-channel electromyography signal in the first time interval being in the non-neutral state.

Another objective of the present disclosure is to provide a gesture recognition method, which is adapted for use in an electronic apparatus. The gesture recognition method comprises the following steps: receiving a plurality of inertial measurement parameters corresponding to a hand of a user and a single-channel electromyography signal corresponding to the hand; determining, at a first time point, that the single-channel electromyography signal in a first time interval is in a non-neutral state or a neutral state; and recognizing a gesture of the user at the first time point based on the inertial measurement parameters in response to the single-channel electromyography signal in the first time interval being in the non-neutral state.

A further objective of the present disclosure is to provide a non-transitory computer readable storage medium having a computer program stored therein. The computer program comprises a plurality of codes, the computer program executes a gesture recognition method after being loaded into an electronic apparatus. The gesture recognition method comprises following steps: receiving a plurality of inertial measurement parameters corresponding to a hand of a user and a single-channel electromyography signal corresponding to the hand; determining, at a first time point, that the single-channel electromyography signal in a first time interval is in a non-neutral state or a neutral state; and recognizing a gesture of the user at the first time point based on the inertial measurement parameters in response to the single-channel electromyography signal in the first time interval being in the non-neutral state.

According to the above descriptions, the gesture recognition technology (at least including the device, the method, and the non-transitory computer readable storage medium) provided by the present disclosure first determines whether the single-channel electromyography signal in a time interval is in a non-neutral state or a neutral state. Then, when it is determined that the single-channel electromyography signal in the first time interval is in the non-neutral state, the user's gesture at the first time point is recognized based on the inertial measurement parameters. In addition, when it is determined that the single-channel electromyography signal in the first time interval is in the neutral state, the gesture of the user at the first time point is not recognized. The gesture recognition technology provided in this disclosure first determines whether to perform gesture recognition operations by referring to the values of single-channel electromyography signals, thereby reducing the cost of computing resources and reducing the chance of misjudgment. In addition, since the present disclosure refers to both inertial measurement parameters and electromyography signals, the device of the disclosure does not need to be equipped with a multi-channel electromyography sensor to achieve correct gesture recognition operation.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a wearable device, gesture recognition method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
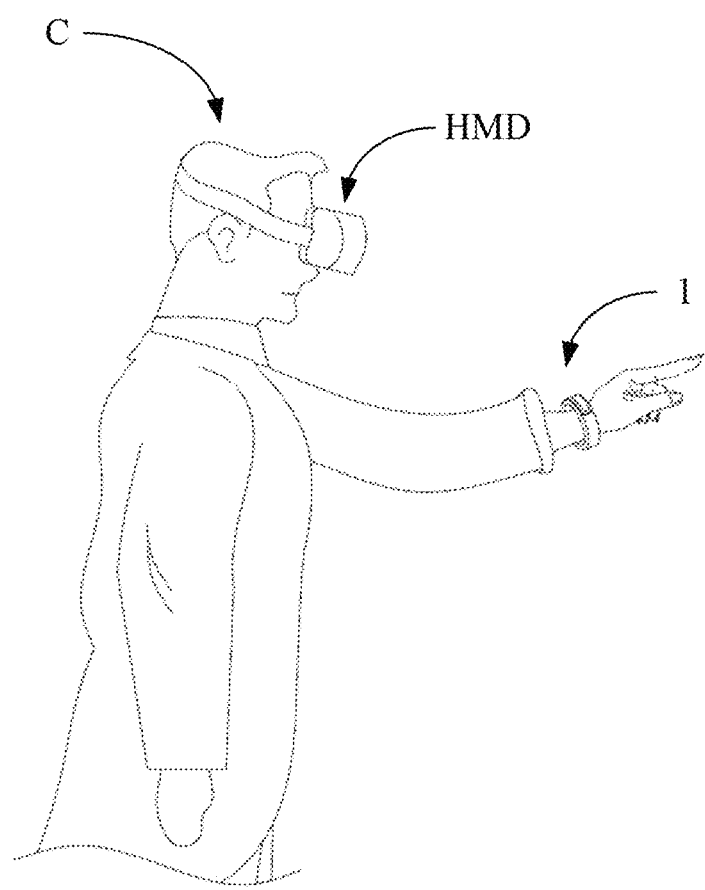
FIG. 1 is a schematic diagram depicting the applicable scene of the wearable device of the first embodiment.

First, the applicable scene of the present embodiment will be described, and a schematic diagram of which is depicted in FIG. 1. As shown in FIG. 1, in the application environment of the present disclosure, a user C may use the head-mounted display HMD, and the user C may wear one or more wearable device 1 (for example: smart bracelets, smart watches, etc.) on the hand (e.g., finger, wrist, etc.) to perform input operations (e.g., gesture input operations) corresponding to the head-mounted display HMD.

It shall be appreciated that FIG. 1 is merely an example for illustration, and the present disclosure does not limit the number of wearable devices 1 connected to the head-mounted display HMD. The head-mounted display HMD can be connected to one or more wearable devices at the same time, depending on the scale of the device and the actual needs of the user C.

Figure 2:
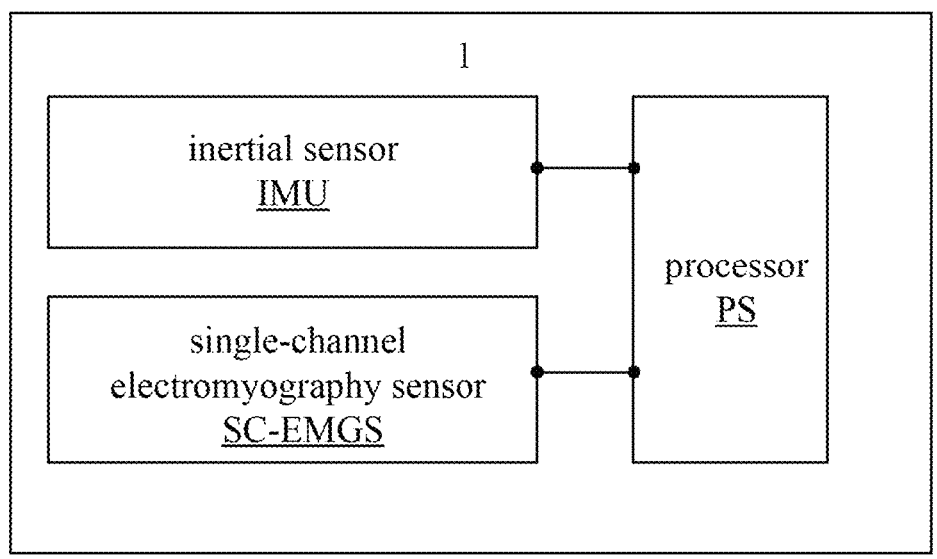
FIG. 2 is a schematic diagram depicting the wearable device of some embodiments.

In the first embodiment of the present disclosure, as shown in FIG. 2, the wearable device 1 comprises an inertial sensor IMU, a single-channel electromyography sensor SC-EMGS and a processor PS, and the processor PS is coupled to the inertial sensor IMU and the single-channel electromyography sensor SC-EMGS.

In the present embodiment, the inertial sensor IMU is configured to generate a plurality of inertial measurement parameters corresponding to the hand of user C. Specifically, the inertial sensor may continuously generate a sequence of a plurality of inertial measurement parameters (for example, an inertial measurement parameter stream generated at a frequency of 10 times per second). It shall be appreciated that in the present disclosure, the inertial sensor IMU may only include a gyroscope and an accelerometer, without configurations such as a magnetometer or a barometer.

In the present embodiment, the single-channel electromyography sensor SC-EMGS is configured to generate a single-channel electromyography (EMG) signal corresponding to the hand. It shall be appreciated that since the present disclosure only requires a single-channel EMG sensor to operate, there is no need to frequently calibrate the position of the EMG sensor.

It shall be appreciated that the processor PS may be any of various processors, Central Processing Units (CPUs), microprocessors, digital signal processors or other computing apparatuses known to those of ordinary skill in the art.

Figure 4:
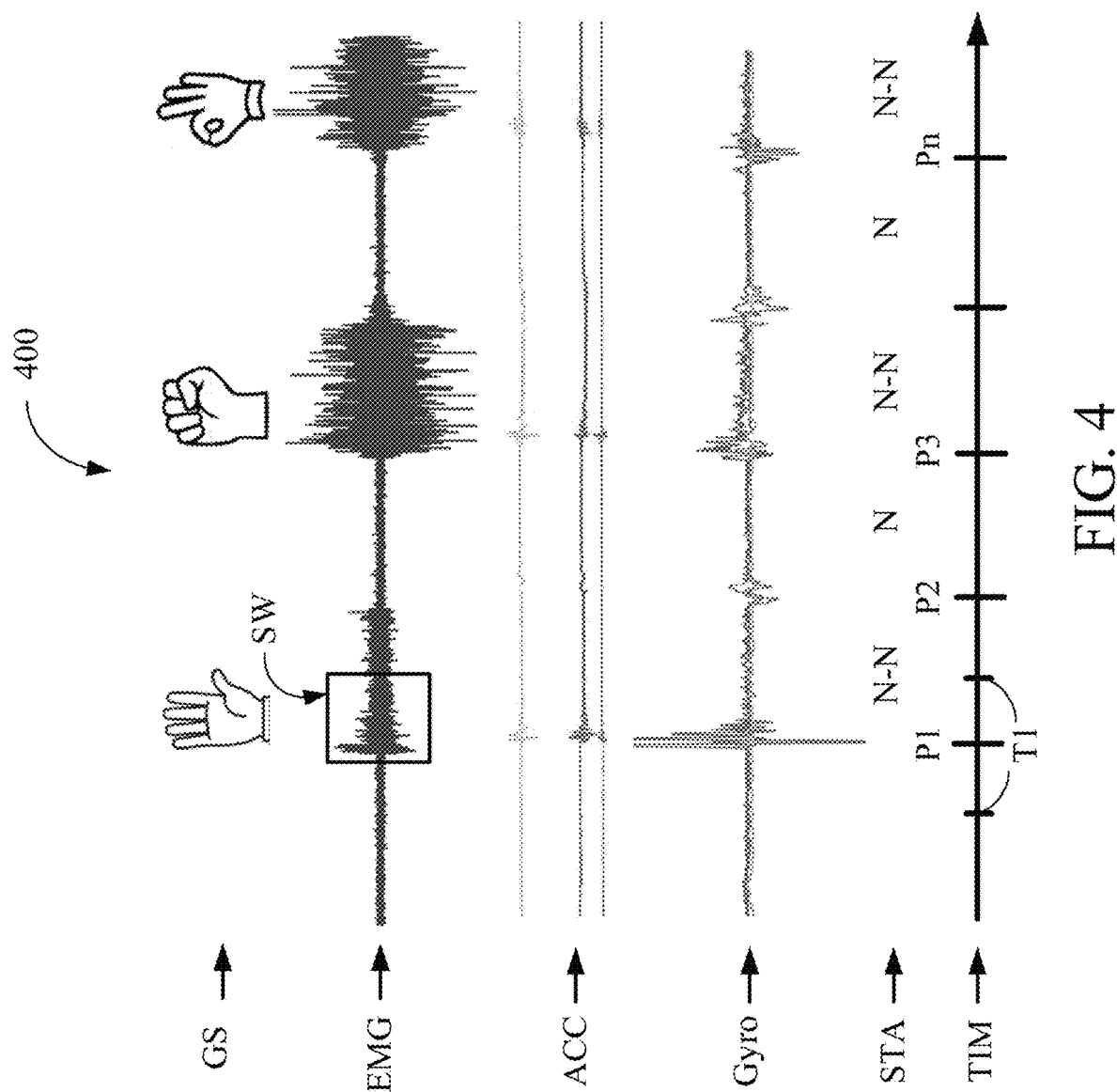
FIG. 4 is a schematic diagram depicting the timing sequence of some embodiments.

For ease of understanding, please refer to the timing sequence diagram 400 of FIG. 4, which illustrates the changes in each parameter signal value collected at each time point (for example: P1 time point to Pn time point on the time axis TIM), the state STA corresponding to each time interval after determination (for example: non-neutral state N-N or neutral state N), and the corresponding gesture GS after recognition.

As shown in FIG. 4, the inertial measurement parameters may include acceleration ACC and angular acceleration Gyro corresponding to different time points. In addition, the single-channel electromyography signal EMGS includes single-channel electromyography EMG corresponding to different time points.

From the data changes in the timing sequence diagram 400, it can be seen that the inertial measurement parameters may only collect short and sharp changes when the user C performs actions. However, if the user C continues to perform actions (for example, continues to maintain gestures), the inertial measurement parameters may not be able to provide complete activity information of the user C. On the other hand, if the user C continues to perform actions, single-channel electromyography EMG can completely provide the user C's activity information in continuous time (i.e., with obvious change values).

First, in the present embodiment, as shown in FIG. 4, the processor PS determines at the time point P1 (for example: referred to as the first time point in some embodiments) that the single-channel electromyography signal EMGS in the time interval T1 (for example: referred to as the first time interval in some embodiments) is in the non-neutral state N-N or the neutral state N.

It shall be appreciated that when the user C wears the single-channel electromyography sensor SC-EMGS, the stronger the muscle force exerted at the position, the higher the amplitude of the single-channel electromyography signal generated. Therefore, if the single-channel electromyography signal EMGS is in the non-neutral state N-N, it may represent that the user C is in a force-exerting state. In addition, if the single-channel electromyography signal EMGS is in the neutral state N, it may represent that the user C is in a relatively stationary state.

In some embodiments, the processor PS can determine the non-neutral state N-N or the neutral state N by comparing whether the single-channel electromyography signal EMGS in the time interval exceeds an amplitude value. For example, the processor PS compares whether an amplitude value of the single-channel electromyography signal EMGS in the first time interval exceeds a preset threshold. Then, in response to the amplitude value of the single-channel electromyography signal EMGS in the first time interval exceeding the preset threshold, the processor PS determines that the single-channel electromyography signal EMGS is in a non-neutral state N-N. In addition, the processor PS determines that the single-channel electromyography signal EMGS is in the neutral state N in response to the amplitude value of the single-channel electromyography signal EMGS in the first time interval being lower than the preset threshold.

In some embodiments, the processor PS may determine whether the single-channel electromyography signal EMGS is in a non-neutral state N-N or the neutral state N by comparing whether the single-channel electromyography signal exceeds the amplitude value through dynamic time intervals (for example: the sliding window SW in FIG. 4).

It shall be appreciated that the relative relationship and position of the time point P1 and the time interval T1 illustrated in FIG. 4 are only for illustration and are not used to limit the scope of the present disclosure.

Next, in the present embodiment, the processor PS recognizes a gesture of the user at the first time point based on the inertial measurement parameters in response to the single-channel electromyography signal EMGS in the first time interval being in the non-neutral state N-N.

In some embodiments, the processor PS can input the inertial measurement parameters to a convolutional neural network (for example, a trained convolutional neural network) to generate a gesture corresponding to the user C.

It shall be appreciated that by taking the body parts as fingers as an example, the trained convolutional neural network can be a gesture classifier. Specifically, the convolutional neural network can be used to analyze the inertial measurement parameters and generate gestures corresponding to the inertial measurement parameters. In some embodiments, the convolutional neural network can be trained with labeled inertial measurement data (e.g., the inertial measurement parameters corresponding to the fingers).

In some embodiments, in order to save computing costs, the processor PS may only perform subsequent gesture recognition when the single-channel electromyography signal EMGS is in the non-neutral state N-N. On the contrary, when the single-channel electromyography signal EMGS is in the neutral state N, the gesture recognition operation is not performed.

Specifically, in response to the single-channel electromyography signal EMGS in the first time interval being in the neutral state N, the processor PS does not recognize the gesture of the user C at the first time point (for example: the time interval from time point P2 to time point P3 in FIG. 4).

In some embodiments, in order to recognize gestures more accurately, the processor PS can perform gesture recognition operations through the inertial measurement parameters in a time interval, and the time interval corresponds to a part of the time interval used to determine the corresponding single-channel electromyography signal EMGS. Specifically, the processor PS recognizes the gesture of the user C at the first time point based on the inertial measurement parameters of a second time interval, where the second time interval is a part of the first time interval (for example: the second half of the time interval T1 in FIG. 4).

In some embodiments, in order to recognize gestures more accurately, the processor PS can also perform gesture recognition operations through the inertial measurement parameters and the single-channel electromyography signal EMGS at the same time. Specifically, in response to the single-channel electromyography signal EMGS in the first time interval being in the non-neutral state N-N, the processor PS recognizes the gesture of the user at the first time point based on the inertial measurement parameters and the single-channel electromyography signal EMGS.

In some embodiments, the wearable device 1 may further include a result data buffer (not shown) and an inertial measurement parameter data buffer (not shown) or a single-channel electromyography signal data buffer (not shown) coupled to the processor PS.

It shall be appreciated that the inertial measurement parameter data buffer and the single-channel electromyography signal data buffer can be used to temporarily store the data generated by the inertial sensor IMU and the single-channel electromyography sensor SC-EMGS.

In addition, the result data buffer can be used to store the determination result of the single-channel electromyography signal EMGS. The processor PS can know whether there is the determined gesture through the data in the result data buffer (i.e., possible ongoing gestures).

Specifically, in response to the single-channel electromyography signal EMGS in the first time interval being in the non-neutral state N-N, the processor PS stores the determination result corresponding to the single-channel electromyography signal EMGS in the first time interval into the result data buffer. In addition, in response to the single-channel electromyography signal EMGS in the first time interval being in the neutral state N, the processor PS deletes the determination result corresponding to the single-channel electromyography signal EMGS in the first time interval in the result data buffer.

In some embodiments, the processor PS may determine whether the gesture is a continuous action by determining whether the result data buffer is empty, and without performing another gesture recognition operation. Specifically, the processor PS determines at a time point (for example: referred to as the fifth time point in some embodiments) that the single-channel electromyography signal EMGS in a time interval (for example: referred to as the fifth time interval in some embodiments) is in the non-neutral state N-N or the neutral state N. Next, in response to the single-channel electromyography signal EMGS in the time interval being in the non-neutral state N-N, the processor PS determines whether the result data buffer is empty. In response to the result data buffer being not empty, the processor PS does not recognize the gesture of the user at the time point.

In addition, in some embodiments, the corresponding gesture application can be determined by calculating the duration of the gesture. Specifically, the processor PS determines at a time point (for example: referred to as the second time point in some embodiments) that the single-channel electromyography signal EMGS in a time interval (for example: referred to as the second time interval in some embodiments) is in the non-neutral state N-N or the neutral state N. Next, in response to the single-channel electromyography signal EMGS being in the non-neutral state N-N, the processor PS calculates a duration of the gesture. Finally, the processor PS determines a first control signal corresponding to a first output event among a plurality of output events based on the gesture and the duration.

Figure 5A:
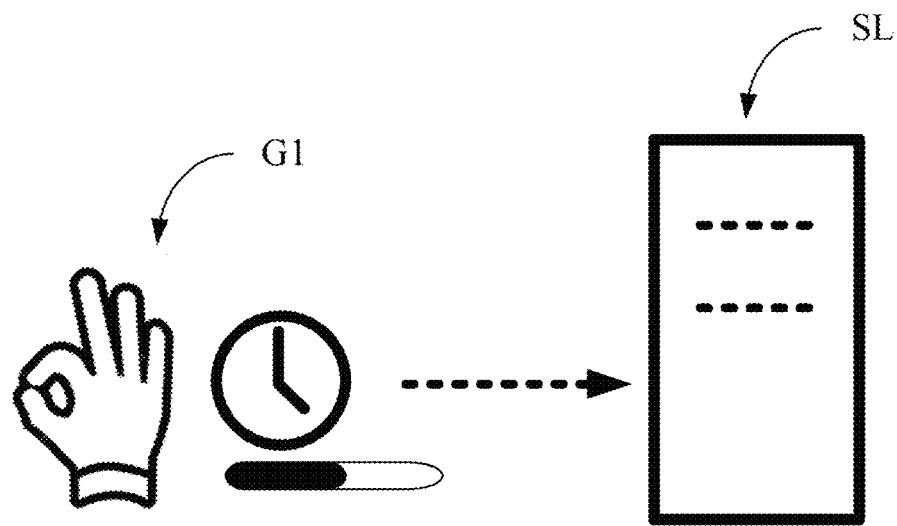
FIG. 5A is a schematic diagram depicting the operation of some embodiments.

For example, as shown in FIG. 5A, the processor PS determines that the gesture is G1 and the gesture of user C is maintained for more than 3 seconds. The processor PS compares the rules in the output events and generates an output event corresponding to the display menu SL.

In addition, in some embodiments, the processor PS can determine the corresponding gesture application by calculating the movement value of the gesture. Specifically, the processor PS determines at a time point (for example: referred to as the third time point in some embodiments) that the single-channel electromyography signal EMGS in a time interval (for example: referred to as the third time interval in some embodiments) is in the non-neutral state N-N or the neutral state N. Next, in response to the single-channel electromyography signal EMGS being in the non-neutral state N-N, the processor PS generates a first movement value corresponding to the gesture based on the inertial measurement parameters between the first time point and the third time point. Finally, the processor PS generates a second control signal corresponding to a second output event among a plurality of output events based on the gesture and the first movement value.

Figure 5B:
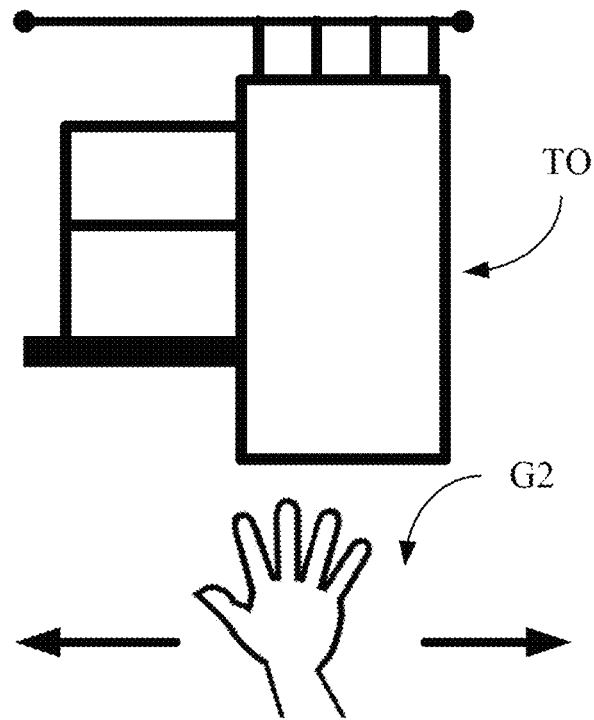
FIG. 5B is a schematic diagram depicting the operation of some embodiments.

For example, as shown in FIG. 5B, the processor PS determines that the gesture is G2 and that the gesture of the user C has a movement value in the direction. The processor PS compares the rules in the output events and generates an output event that moves the target object TO (for example, curtains) based on the movement value.

Figure 6A:
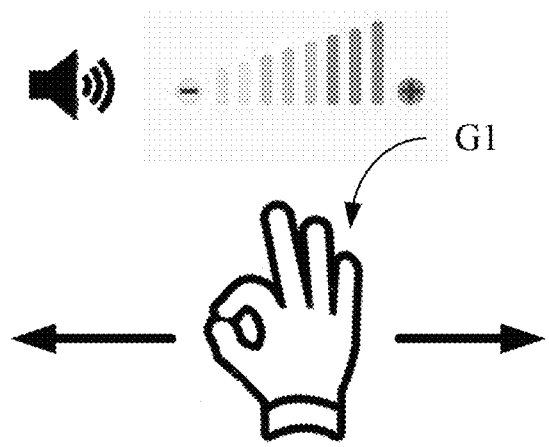
FIG. 6A is a schematic diagram depicting the operation of some embodiments.

For another example, as shown in FIG. 6A, the processor PS determines that the gesture is G1 and the gesture of the user C has a movement value in the direction. The processor PS compares the rules in the output events and generates an output event that adjusts the volume value based on the movement value.

In addition, in some embodiments, the corresponding gesture application can be determined by calculating the movement value of the gesture and subsequent continuous actions. Specifically, the processor PS determines at a time point (for example: referred to as the fourth time point in some embodiments) that the single-channel electromyography signal EMGS in a time interval (for example: referred to as the fourth time interval in some embodiments) is in the non-neutral state N-N or the neutral state N. Next, in response to the single-channel electromyography signal EMGS being in the neutral state N, the processor PS generates a third control signal corresponding to a third output event among the output events.

Figure 6B:
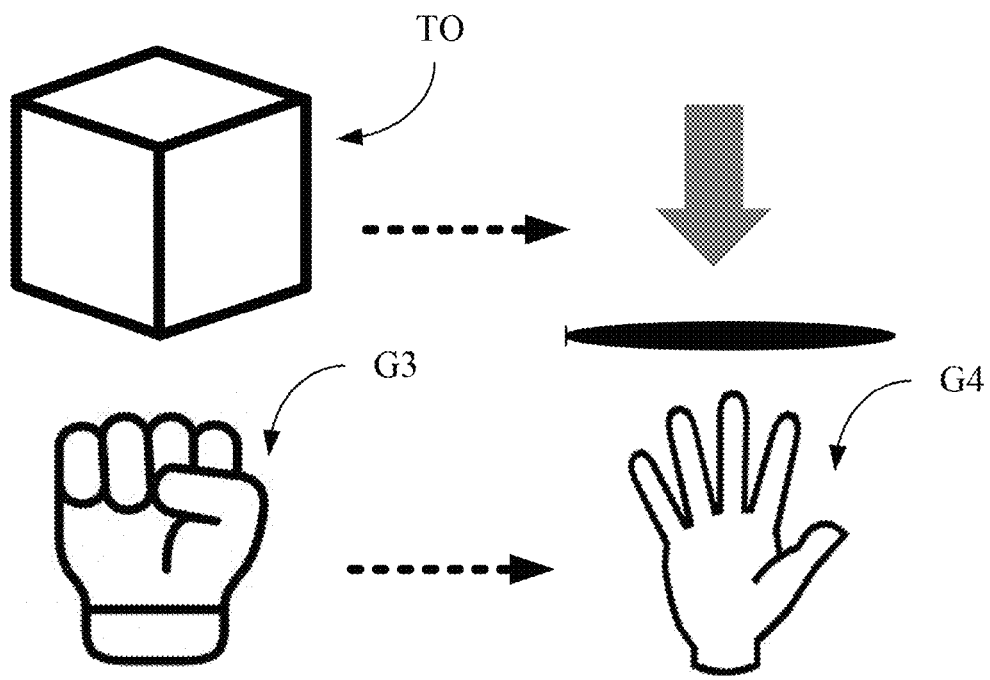
FIG. 6B is a schematic diagram depicting the operation of some embodiments.

For example, as shown in FIG. 6B, the processor PS determines at the first time point that the gesture is G3 and that the gesture of the user C has a movement value in the direction, and the single-channel electromyography signal is in the neutral state N (i.e., hand-release gesture G4) at the second time point. The processor PS compares the rules in the output events and generates an output event that moves the target object TO (for example, a box) based on the movement value and moves the target object TO to a position and places it down.

Figure 3A:
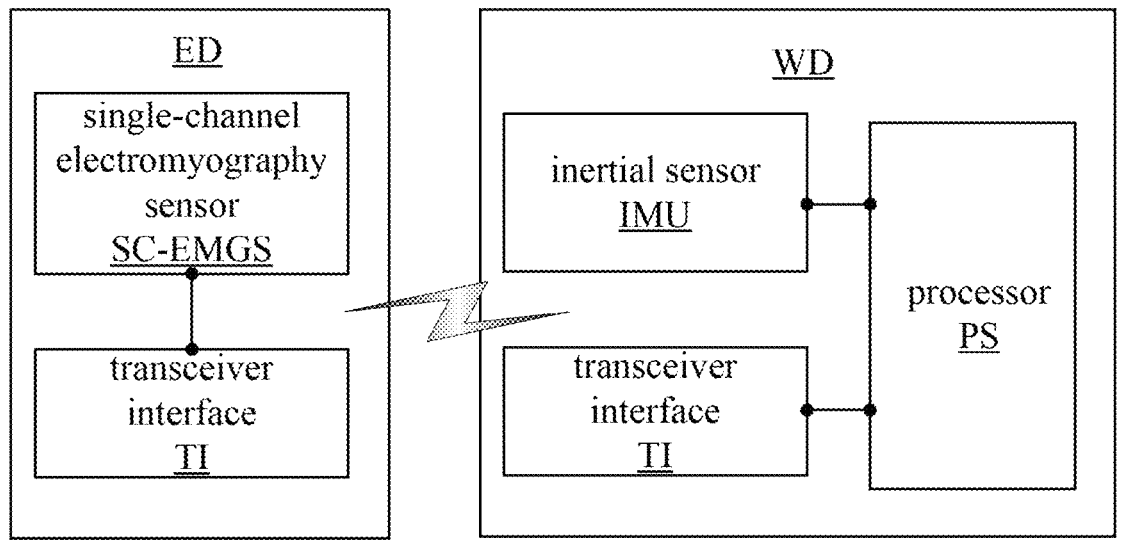
FIG. 3A is a schematic diagram depicting the wearable device and the expansion device of some embodiments.

In some embodiments, the present disclosure can also be used with a wearable device WD and an expansion device ED, and the expansion device ED transmits data to the wearable device WD for data processing. For example, as shown in FIG. 3A, the wearable device WD includes an inertial sensor IMU, a processor PS and a transceiver interface TI. The expansion device ED includes the single-channel electromyography sensor SC-EMGS and the transceiver interface TI.

Figure 3B:
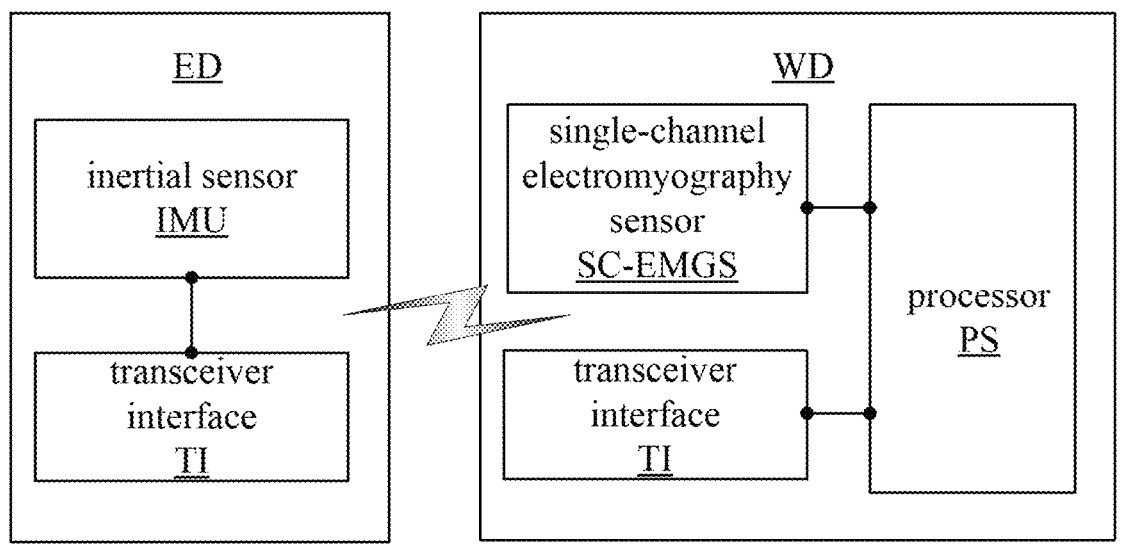
FIG. 3B is a schematic diagram depicting the wearable device and the expansion device of some embodiments.

For another example, as shown in FIG. 3B, the wearable device WD includes a single-channel electromyography sensor SC-EMGS, a processor PS and a transceiver interface TI. The expansion device ED includes the inertial sensor IMU and the transceiver interface TI.

According to the above descriptions, the wearable device 1 provided by the present disclosure first determines whether the single-channel electromyography signal in a time interval is in a non-neutral state or a neutral state. Then, when it is determined that the single-channel electromyography signal in the first time interval is in the non-neutral state, the user's gesture at the first time point is recognized based on the inertial measurement parameters. In addition, when it is determined that the single-channel electromyography signal in the first time interval is in the neutral state, the gesture of the user at the first time point is not recognized. The wearable device 1 provided by the present disclosure first determines whether to perform gesture recognition operations by referring to the values of single-channel electromyography signals, thereby reducing the cost of computing resources and reducing the chance of misjudgment. In addition, since the present disclosure refers to both inertial measurement parameters and electromyography signals, the device of the disclosure does not need to be equipped with a multi-channel electromyography sensor to achieve correct gesture recognition operation.

Figure 7:
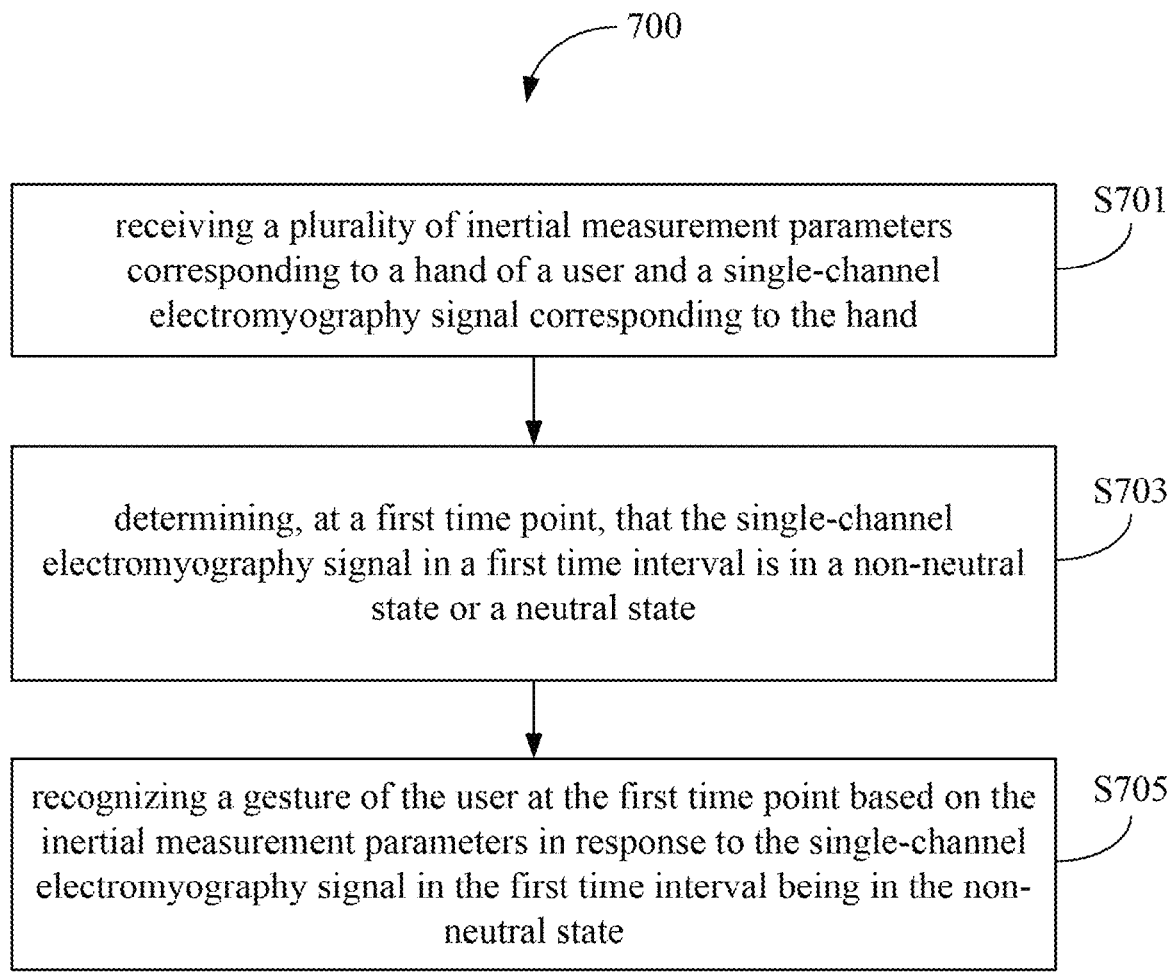
FIG. 7 is a partial flowchart depicting the gesture recognition method of the second embodiment.

A second embodiment of the present disclosure is a gesture recognition method and a flowchart thereof is depicted in FIG. 7. The gesture recognition method 700 is adapted for an electronic apparatus (e.g., the wearable device 1, the wearable device WD and the expansion device ED, or the head-mounted display HMD described in the first embodiment). The gesture recognition method 700 recognizes the user's gesture through steps S701 to S705.

In the step S701, the electronic apparatus receives a plurality of inertial measurement parameters corresponding to a hand of a user and a single-channel electromyography signal corresponding to the hand. Next, in the step S703, the electronic apparatus determines, at a first time point, that the single-channel electromyography signal in a first time interval is in a non-neutral state or a neutral state.

Finally, in the step S705, the electronic apparatus recognizes a gesture of the user at the first time point based on the inertial measurement parameters in response to the single-channel electromyography signal in the first time interval being in the non-neutral state.

In some embodiments, the gesture recognition method 700 further comprises the following steps: in response to the single-channel electromyography signal in the first time interval being in the neutral state, not recognizing the gesture of the user at the first time point.

In some embodiments, wherein the step of determining that the single-channel electromyography signal is in the non-neutral state or the neutral state further comprises the following steps: comparing whether an amplitude value of the single-channel electromyography signal in the first time interval exceeds a preset threshold; in response to the amplitude value of the single-channel electromyography signal in the first time interval exceeding the preset threshold, determining that the single-channel electromyography signal is in the non-neutral state; and in response to the amplitude value of the single-channel electromyography signal in the first time interval being lower than the preset threshold, determining that the single-channel electromyography signal is in the neutral state.

In some embodiments, wherein the step of recognizing the gesture of the user at the first time point further comprises the following steps: recognizing the gesture of the user at the first time point based on the inertial measurement parameters of a second time interval, wherein the second time interval is a part of the first time interval.

In some embodiments, the gesture recognition method 700 further comprises the following steps: determining, at a second time point, that the single-channel electromyography signal in a second time interval is in the non-neutral state or the neutral state; in response to the single-channel electromyography signal being in the non-neutral state, calculating a duration of the gesture; and determining a first control signal corresponding to a first output event among a plurality of output events based on the gesture and the duration.

In some embodiments, the gesture recognition method 700 further comprises the following steps: determining, at a third time point, that the single-channel electromyography signal in a third time interval is in the non-neutral state or the neutral state; in response to the single-channel electromyography signal being in the non-neutral state, generating a first movement value corresponding to the gesture based on the inertial measurement parameters between the first time point and the third time point; and generating a second control signal corresponding to a second output event among a plurality of output events based on the gesture and the first movement value.

In some embodiments, the gesture recognition method 700 further comprises the following steps: determining, at a fourth time point, that the single-channel electromyography signal in a fourth time interval is in the non-neutral state or the neutral state; and in response to the single-channel electromyography signal being in the neutral state, generating a third control signal corresponding to a third output event among the output events.

In some embodiments, the gesture recognition method 700 further comprises the following steps: in response to the single-channel electromyography signal in the first time interval being in the non-neutral state, storing a determination result corresponding to the single-channel electromyography signal in the first time interval into a result data buffer; and in response to the single-channel electromyography signal in the first time interval being in the neutral state, deleting the determination result corresponding to the single-channel electromyography signal in the first time interval in the result data buffer.

In some embodiments, the gesture recognition method 700 further comprises the following steps: determining, at a fifth time point, that the single-channel electromyography signal in a fifth time interval is in the non-neutral state or the neutral state; in response to the single-channel electromyography signal in the fifth time interval being in the non-neutral state, determining whether the result data buffer is empty; in response to the result data buffer being not empty, not recognizing the gesture of the user at the fifth time point.

In addition to the aforesaid steps, the second embodiment can also execute all the operations and steps of the wearable device 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The gesture recognition method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the wearable device 1, the wearable device WD and the expansion device ED, or the head-mounted display HMD), the computer program executes the gesture recognition method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the time point, the time interval, etc.) are preceded by terms such as "first", "second", "third", "fourth", or "fifth", and these terms of "first", "second", "third", "fourth", or "fifth" are only used to distinguish these different words. For example, the "first" and "second" time points are only used to indicate the time point used in different operations.

According to the above descriptions, the gesture recognition technology (at least including the device, the method, and the non-transitory computer readable storage medium) provided by the present disclosure first determines whether the single-channel electromyography signal in a time interval is in a non-neutral state or a neutral state. Then, when it is determined that the single-channel electromyography signal in the first time interval is in the non-neutral state, the user's gesture at the first time point is recognized based on the inertial measurement parameters. In addition, when it is determined that the single-channel electromyography signal in the first time interval is in the neutral state, the gesture of the user at the first time point is not recognized. The gesture recognition technology provided in this disclosure first determines whether to perform gesture recognition operations by referring to the values of single-channel electromyography signals, thereby reducing the cost of computing resources and reducing the chance of misjudgment. In addition, since the present disclosure refers to both inertial measurement parameters and electromyography signals, the device of the disclosure does not need to be equipped with a multi-channel electromyography sensor to achieve correct gesture recognition operation.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wearable device, comprising:
an inertial sensor, configured to generate a plurality of inertial measurement parameters corresponding to a hand of a user;
a single-channel electromyography sensor, configured to generate a single-channel electromyography signal corresponding to the hand; and
a processor, coupled to the inertial sensor and the single-channel electromyography sensor, and configured to perform the following operations:
determining, at a first time point, that the single-channel electromyography signal in a first time interval is in a non-neutral state or a neutral state; and
recognizing a gesture of the user at the first time point based on the inertial measurement parameters in response to the single-channel electromyography signal in the first time interval being in the non-neutral state.

2. The wearable device of claim 1, wherein the processor is further configured to perform the following operations:
in response to the single-channel electromyography signal in the first time interval being in the neutral state, not recognizing the gesture of the user at the first time point.

3. The wearable device of claim 1, wherein the operation of determining that the single-channel electromyography signal is in the non-neutral state or the neutral state further comprises the following operations:
comparing whether an amplitude value of the single-channel electromyography signal in the first time interval exceeds a preset threshold;
in response to the amplitude value of the single-channel electromyography signal in the first time interval exceeding the preset threshold, determining that the single-channel electromyography signal is in the non-neutral state; and
in response to the amplitude value of the single-channel electromyography signal in the first time interval being lower than the preset threshold, determining that the single-channel electromyography signal is in the neutral state.

4. The wearable device of claim 1, wherein the operation of recognizing the gesture of the user at the first time point further comprises the following operations:
recognizing the gesture of the user at the first time point based on the inertial measurement parameters of a second time interval, wherein the second time interval is a part of the first time interval.

5. The wearable device of claim 1, wherein the processor is further configured to perform the following operations:
determining, at a second time point, that the single-channel electromyography signal in a second time interval is in the non-neutral state or the neutral state;
in response to the single-channel electromyography signal being in the non-neutral state, calculating a duration of the gesture; and
determining a first control signal corresponding to a first output event among a plurality of output events based on the gesture and the duration.

6. The wearable device of claim 1, wherein the processor is further configured to perform the following operations:
determining, at a third time point, that the single-channel electromyography signal in a third time interval is in the non-neutral state or the neutral state;
in response to the single-channel electromyography signal being in the non-neutral state, generating a first movement value corresponding to the gesture based on the inertial measurement parameters between the first time point and the third time point; and
generating a second control signal corresponding to a second output event among a plurality of output events based on the gesture and the first movement value.

7. The wearable device of claim 6, wherein the processor is further configured to perform the following operations:
determining, at a fourth time point, that the single-channel electromyography signal in a fourth time interval is in the non-neutral state or the neutral state; and
in response to the single-channel electromyography signal being in the neutral state, generating a third control signal corresponding to a third output event among the output events.

8. The wearable device of claim 1, wherein the wearable device further comprises a result data buffer, coupled to the processor and configured to store a determination result of the single-channel electromyography signal;
wherein the processor is further configured to perform the following operations:
in response to the single-channel electromyography signal in the first time interval being in the non-neutral state, storing the determination result corresponding to the single-channel electromyography signal in the first time interval into the result data buffer; and
in response to the single-channel electromyography signal in the first time interval being in the neutral state, deleting the determination result corresponding to the single-channel electromyography signal in the first time interval in the result data buffer.

9. The wearable device of claim 8, wherein the processor is further configured to perform the following operations:
determining, at a fifth time point, that the single-channel electromyography signal in a fifth time interval is in the non-neutral state or the neutral state;
in response to the single-channel electromyography signal in the fifth time interval being in the non-neutral state, determining whether the result data buffer is empty; and
in response to the result data buffer being not empty, not recognizing the gesture of the user at the fifth time point.

10. The wearable device of claim 1, wherein the processor is further configured to perform the following operations:
in response to the single-channel electromyography signal in the first time interval being in the non-neutral state, recognizing the gesture of the user at the first time point based on the inertial measurement parameters and the single-channel electromyography signal.

11. A gesture recognition method, being adapted for use in an electronic apparatus, wherein gesture recognition method comprises the following steps:
receiving a plurality of inertial measurement parameters corresponding to a hand of a user and a single-channel electromyography signal corresponding to the hand;
determining, at a first time point, that the single-channel electromyography signal in a first time interval is in a non-neutral state or a neutral state; and
recognizing a gesture of the user at the first time point based on the inertial measurement parameters in response to the single-channel electromyography signal in the first time interval being in the non-neutral state.

12. The gesture recognition method of claim 11, wherein the gesture recognition method further comprises the following steps:
in response to the single-channel electromyography signal in the first time interval being in the neutral state, not recognizing the gesture of the user at the first time point.

13. The gesture recognition method of claim 11, wherein the step of determining that the single-channel electromyography signal is in the non-neutral state or the neutral state further comprises the following steps:
comparing whether an amplitude value of the single-channel electromyography signal in the first time interval exceeds a preset threshold;
in response to the amplitude value of the single-channel electromyography signal in the first time interval exceeding the preset threshold, determining that the single-channel electromyography signal is in the non-neutral state; and in response to the amplitude value of the single-channel electromyography signal in the first time interval being lower than the preset threshold, determining that the single-channel electromyography signal is in the neutral state.

14. The gesture recognition method of claim 11, wherein the step of recognizing the gesture of the user at the first time point further comprises the following steps:
recognizing the gesture of the user at the first time point based on the inertial measurement parameters of a second time interval, wherein the second time interval is a part of the first time interval.

15. The gesture recognition method of claim 11, wherein the gesture recognition method further comprises following steps:
determining, at a second time point, that the single-channel electromyography signal in a second time interval is in the non-neutral state or the neutral state;
in response to the single-channel electromyography signal being in the non-neutral state, calculating a duration of the gesture; and
determining a first control signal corresponding to a first output event among a plurality of output events based on the gesture and the duration.

16. The gesture recognition method of claim 11, wherein the gesture recognition method further comprises following steps:
determining, at a third time point, that the single-channel electromyography signal in a third time interval is in the non-neutral state or the neutral state;
in response to the single-channel electromyography signal being in the non-neutral state, generating a first movement value corresponding to the gesture based on the inertial measurement parameters between the first time point and the third time point; and
generating a second control signal corresponding to a second output event among a plurality of output events based on the gesture and the first movement value.

17. The gesture recognition method of claim 16, wherein the gesture recognition method further comprises following steps:
determining, at a fourth time point, that the single-channel electromyography signal in a fourth time interval is in the non-neutral state or the neutral state; and
in response to the single-channel electromyography signal being in the neutral state, generating a third control signal corresponding to a third output event among the output events.

18. The gesture recognition method of claim 11, wherein the gesture recognition method further comprises following steps:
in response to the single-channel electromyography signal in the first time interval being in the non-neutral state, storing a determination result corresponding to the single-channel electromyography signal in the first time interval into a result data buffer; and
in response to the single-channel electromyography signal in the first time interval being in the neutral state, deleting the determination result corresponding to the single-channel electromyography signal in the first time interval in the result data buffer.

19. The gesture recognition method of claim 18, wherein the gesture recognition method further comprises following steps:
determining, at a fifth time point, that the single-channel electromyography signal in a fifth time interval is in the non-neutral state or the neutral state;
in response to the single-channel electromyography signal in the fifth time interval being in the non-neutral state, determining whether the result data buffer is empty; and
in response to the result data buffer being not empty, not recognizing the gesture of the user at the fifth time point.

20. A non-transitory computer readable storage medium, having a computer program stored therein, wherein the computer program comprises a plurality of codes, the computer program executes a gesture recognition method after being loaded into an electronic apparatus, the gesture recognition method comprises:
receiving a plurality of inertial measurement parameters corresponding to a hand of a user and a single-channel electromyography signal corresponding to the hand;
determining, at a first time point, that the single-channel electromyography signal in a first time interval is in a non-neutral state or a neutral state; and
recognizing a gesture of the user at the first time point based on the inertial measurement parameters in response to the single-channel electromyography signal in the first time interval being in the non-neutral state.

* * * * *